Patented Sept. 19, 1922.

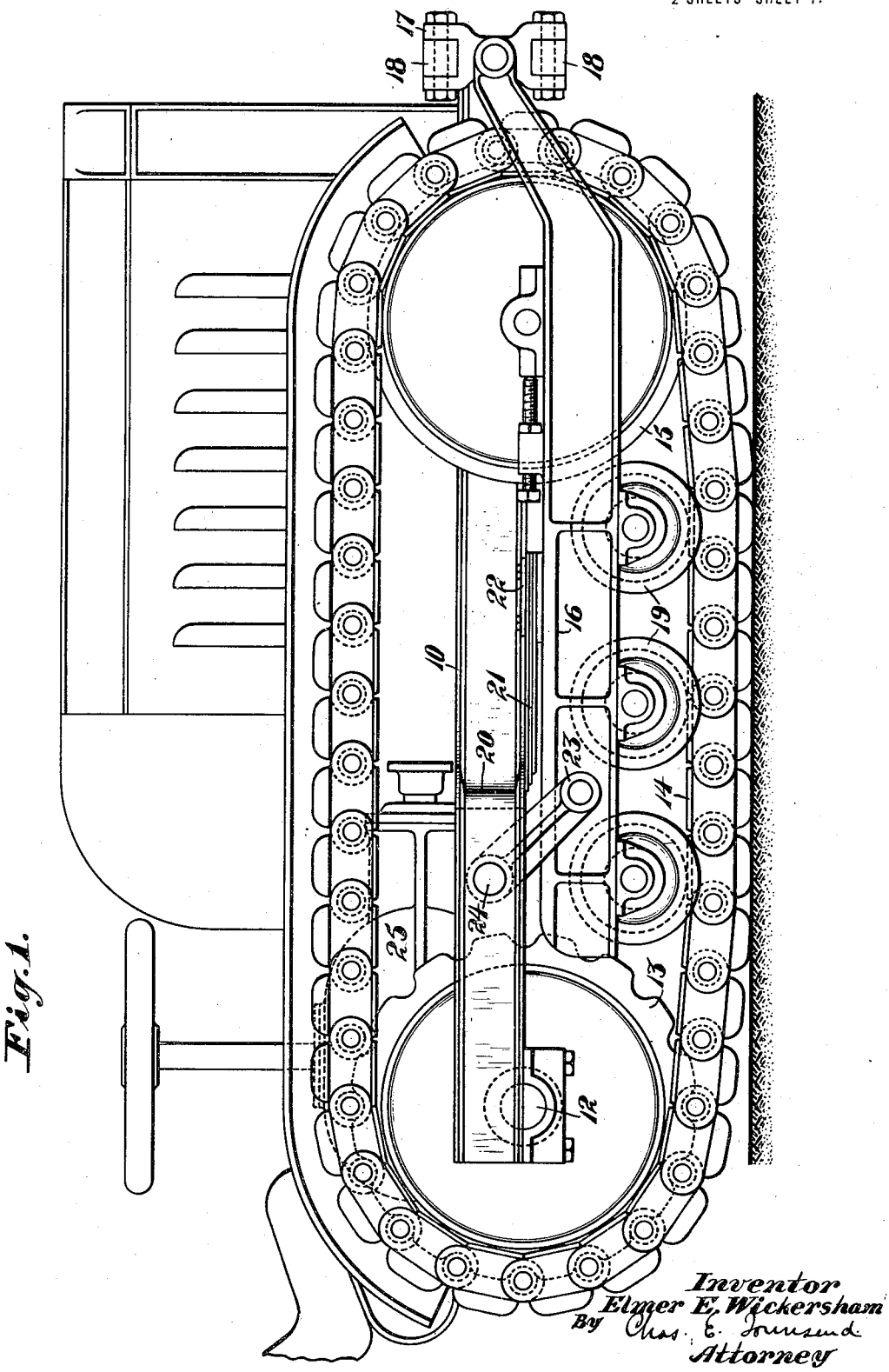

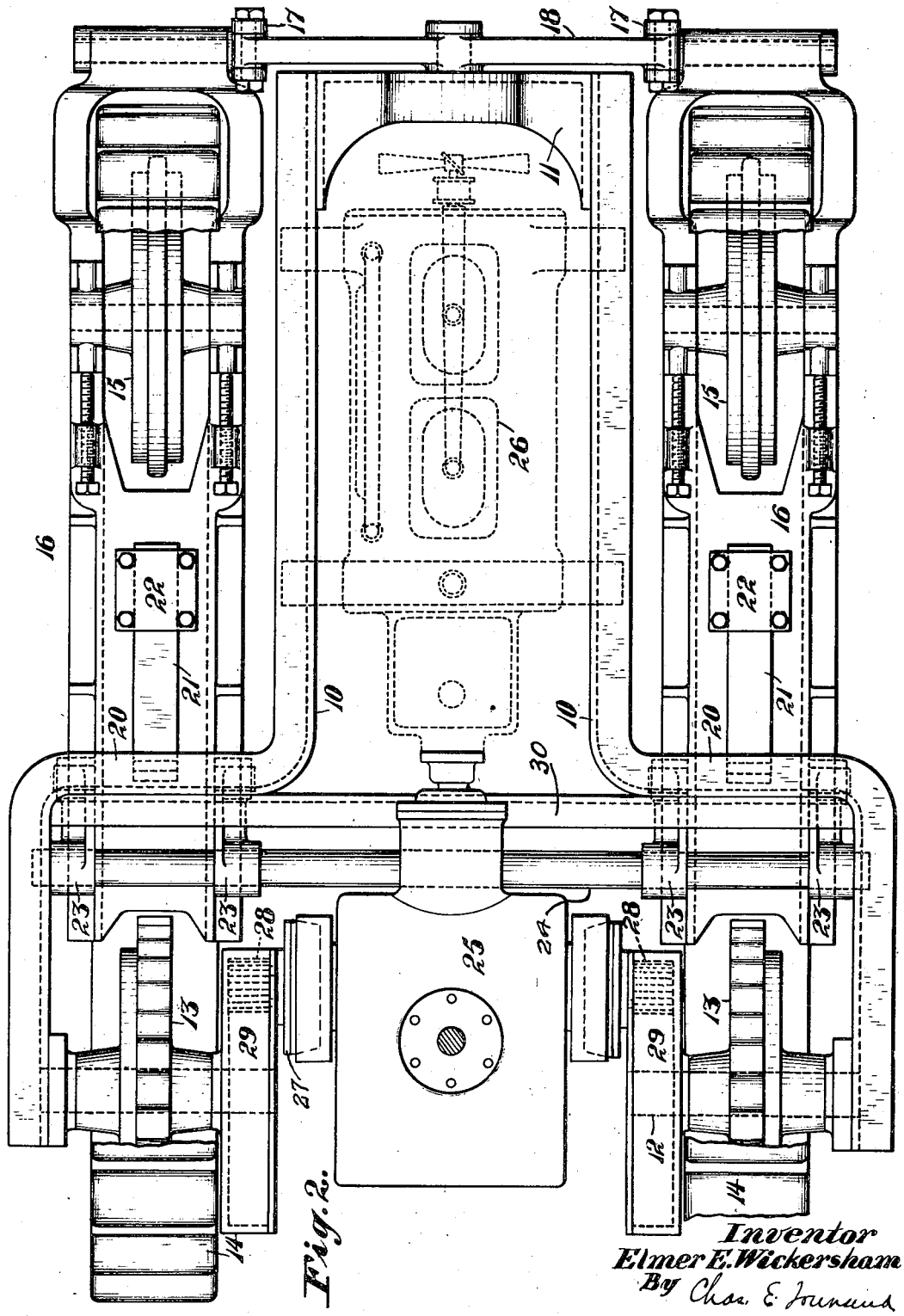

1,429,475

UNITED STATES PATENT OFFICE.

ELMER E. WICKERSHAM, OF OAKLAND, CALIFORNIA, ASSIGNOR TO THE HOLT MANUFACTURING COMPANY, OF STOCKTON, CALIFORNIA, A CORPORATION OF CALIFORNIA.

TRACTOR MAIN FRAME AND SUSPENSION.

Application filed January 26, 1921. Serial No. 439,979.

*To all whom it may concern:*

Be it known that I, ELMER E. WICKERSHAM, a citizen of the United States, residing at Oakland, in the county of Alameda and State of California, have invented new and useful Improvements in Tractor Main Frames and Suspensions, of which the following is a specification.

This invention relates to tractors of the self-laying track type and has for its object to improve and simplify the construction and operation of the main frame suspension.

The tendency in the design of track laying machines is towards lightness and compactness. It has been demonstrated that a weight of 230 pounds per draw bar horse power is sufficient for all ordinary traction purposes if this weight be properly distributed. Compactness is an important consideration in tractors especially those used for orchard and similar work. In the present invention I make use of an extremely compact main frame, U-shaped in plan, each side bar being disposed at the outer side of the rear sprocket wheel and extending forwardly and inwardly across the top of the roller truck frames and being connected across at their forward ends. Where the side bars cross the tops of the truck frames, springs are interposed to yieldingly support them on the truck frames. By disposing the side bars outside of the rear sprocket wheels additional space is provided for the location of driving gears, steering clutches, etc.

One form which my invention may assume is exemplified in the following description and illustrated in the accompanying drawing, in which—

Fig. 1 shows a side elevation of a tractor embodying my invention,

Fig. 2 shows a plan view of the main frame and suspension therefor.

Referring in detail to the accompanying drawing, the main frame is shown as being formed of side bars 10 and a front cross web 11. The side bars and cross web may be integral or otherwise as desired. Usually the side bars are of channel construction and the cross web is in the form of an axle bolted thereto. Each side bar is formed with a horizontal bend 20 intermediate its ends. Between the side bars at their rear is arranged an axle 12 near each end of which inside of the side bars is journalled a sprocket wheel 13 which drives an endless track 14.

The forward end of the track is carried upon and guided by an idler sprocket wheel 15. This idler wheel is journalled upon a roller truck frame 16 formed of parallel side bars which extend from a point just in front of the rear sprocket wheel to the extreme forward end of the main frame where they connect by means of a shackle 17 with parallel equalizer bars 18. The equalizer bars are centrally pivoted to the cross sill 11. The type of equalizer shown herein is more fully set forth in a companion application, Serial No. 439,981, filed by me January 26th, 1921. However, any form of equalizing device may be employed. Between the side bars are journalled rollers 19 operating on the ground stretch of the track.

The horizontal bend in each side bar of the main frame is positioned in front of the adjacent sprocket wheel 13 and extends across the roller truck frame. Where the side bar of the main frame crosses the roller truck frame I support it yieldingly upon a leaf spring 21 fixed at 22 to the top of the truck frame.

To transmit the thrusts from the main frame to the roller truck frame I employ a pair of swinging links 23, one at each side of the roller truck frame, extending upwardly and rearwardly to a stabilizing shaft 24, which shaft extends transversely between opposite sides of the main frame. This shaft together with the axle 12 may also be utilized to support the transmission mechanism indicated generally at 25. The transmission mechanism is operably connected to a motor 26 supported upon the front portion of the main frame, and at each side of the transmission mechanism is a steering friction clutch 27 for driving a pinion 28 which pinion operates a spur gear 29 fixed to the adjacent sprocket wheel 13. Suitable controlling means not illustrated herein are provided for the transmission mechanism and steering clutches.

To additionally brace the main frame I may make use of a channel member 30 extending transversely thereof and bolted to the bends 20 of the opposite side bar.

In the operation of the tractor the weight of the rear portion is transmitted by the main frame through the springs 21 to the roller truck frames, and the weight of the forward portion is transmitted through the equalizer bar 18 to the forward ends of the truck frames. The truck frames are free to rock vertically by their pivotal connection with the thrust links 23 and may also rise and fall bodily, moving forwardly at the same time to accommodate the arcuate movement of the links 23. The equalizer connections used between the truck frames and main frame will permit the necessary rocking movement of the truck frames. Furthermore the thrust links are so inclined when an unyielding obstruction enters between the track and either sprocket wheel the links will tend to assume a vertical position, thus shortening the distance between front and rear sprocket wheels so that slack will be produced in the track to allow the obstruction to pass around the sprocket wheel without danger of breaking the mechanism.

The present form of main frame is simple and economical to build and affords the advantage of providing additional space at the inside of the rear sprocket wheels for the location of driving gears, steering clutches, etc. In the present form I show steering clutches and driving gears arranged between each sprocket wheel and the transmission housing, and yet I am enabled to keep the width of the tractor within very narrow limits. The further advantage of this main frame is the fact that its side bars, by reason of the inward bends therein, may rest directly upon the suspension springs, whereas in prior main frames it has been necessary to extend arms or brackets out from the main frame to rest on these springs.

Various changes in the construction of the several parts of my invention may be made by those skilled in the art without departing from the spirit of my invention as disclosed in the appended claims.

Having thus described my invention, what I claim and desire to secure by Letters Patent is—

1. In a tractor of the self-laying track type a main frame formed of longitudinal sills and a front cross sill, the longitudinal sills being formed with a horizontal bend intermediate their ends, a driving sprocket wheel for the track at the rear of and inside of each longitudinal sill leaving the space between opposite driving wheels unobstructed for the reception of driving and steering mechanism, a roller truck mechanism associated with each track, said longitudinal sills extending across the top of their respective truck mechanisms and continuing forwardly at the inside thereof.

2. In a tractor of the self-laying track type a main frame formed of longitudinal sills and a front cross sill, the longitudinal sills being formed with a horizontal bend intermediate their ends, a driving sprocket wheel for the track at the rear of and inside of each longitudinal sill leaving the space between opposite driving wheels unobstructed for the reception of driving and steering mechanism, a roller truck mechanism associated with each track, said longitudinal sills extending across the top of their respective truck mechanisms and continuing forwardly at the inside thereof, and spring suspension means resting on each truck mechanism and supporting the overlying portion of the longitudinal sill.

3. In a tractor of the self-laying track type including front and rear sprocket wheels at each side, a roller carrying truck mechanism between the sprocket wheels, a main frame having longitudinal sills formed with a horizontal bend intermediate their ends, whose rear ends are disposed outside of the rear sprocket wheels serving to support the axles of said wheels, said side bars extending inwardly across the tops of said truck mechanism and continuing forwardly at the inside of the front sprocket wheels, and a transverse member connecting the forward ends of said longitudinal sills.

4. In a tractor of the self-laying track type including front and rear sprocket wheels at each side, a roller carrying truck mechanism between the sprocket wheels, a main frame having longitudinal sills formed with a horizontal bend intermediate their ends, whose rear ends are disposed outside of the rear sprocket wheels serving to support the axles of said wheels, said side bars extending inwardly across the tops of said truck mechanism and continuing forwardly at the inside of the front sprocket wheels, a transverse member connecting the forward ends of said longitudinal sills and springs arranged beneath said longitudinal sills where they cross over the truck mechanism for supporting said sills.

5. In a tractor of the self-laying track type including rear driving sprocket wheels for the track at each side, a roller truck frame for each track carrying at its forward end an idler sprocket wheel, a main frame having longitudinal sills formed with a horizontal bend intermediate their ends, whose rear ends are disposed at the outside of the driving sprocket wheels and serve to support the axles of the lattter, said longitudinal sills extending inwardly across the top of the truck frames and continuing forwardly at the inside of the front sprocket wheels and a transverse member connecting the longitudinal sills at their forward ends.

6. In a tractor of the self-laying track type including rear driving sprocket wheels for the track at each side, a roller truck frame for each track carrying at its forward end an idler sprocket wheel, a main frame having longitudinal sills formed with a horizontal bend intermediate their ends, whose rear ends are disposed at the outside of the driving sprocket wheels and serve to support the axles of the latter, said longitudinal sills extending inwardly across the top of the truck frames and continuing forwardly at the inside of the front sprocket wheels, a transverse member connecting the longitudinal sills at their forward ends, and an equalizer bar centrally pivoted to the front connecting member of the main frame and connected at its ends to the opposite truck frames.

7. In a tractor of the self-laying track type including rear driving sprocket wheels for the track at each side, a roller truck frame for each track carrying at its forward end an idler sprocket wheel, a main frame having longitudinal sills formed with a horizontal bend intermediate their ends, whose rear ends are disposed at the outside of the driving sprocket wheels and serve to support the axles of the latter, said longitudinal sills extending inwardly across the top of the truck frames and continuing forwardly at the inside of the front sprocket wheels, a transverse member connecting the longitudinal sills at their forward ends, a stabilizing shaft extending between opposite longitudinal sills in front of the rear driving sprocket wheels and thrust connections extending from the stabilizing shaft to each truck frame.

8. In a tractor of the self-laying track type including rear driving sprocket wheels for the track at each side, a roller truck frame for each track carrying at its forward end an idler sprocket wheel, a main frame having longitudinal sills formed with a horizontal bend intermediate their ends, whose rear ends are disposed at the outside of the driving sprocket wheels and serve to support the axles of the latter, said longitudinal sills extending inwardly across the top of the truck frames and continuing forwardly at the inside of the front sprocket wheels, a transverse member connecting the longitudinal sills at their forward ends, a stabilizing shaft extending between opposite longitudinal sills in front of the rear driving sprocket wheels and thrust connections extending from the stabilizing shaft to each truck frame, said thrust connections comprising forwardly and downwardly inclined swinging links.

9. In a tractor of the self-laying track type including rear driving sprocket wheels for the track at each side, a roller truck frame for each track carrying at its forward end an idler sprocket wheel, a main frame having longitudinal sills formed with a horizontal bend intermediate their ends, whose rear ends are disposed at the outside of the driving sprocket wheels and serve to support the axles of the latter, said longitudinal sills extending inwardly across the top of the truck frames and continuing forwardly at the inside of the front sprocket wheels, a transverse member connecting the longitudinal sills at their forward ends, a stabilizing shaft extending between opposite longitudinal sills in front of the rear driving sprocket wheels, thrust connections extending from the stabilizing shaft to each truck frame, the axle for the rear driving sprocket wheels extending between opposite longitudinal sills and serving in conjunction with the stabilizing shaft to support the transmission mechanism which drives said sprocket wheels.

ELMER E. WICKERSHAM.